US011967756B2

(12) United States Patent
Shin et al.

(10) Patent No.: US 11,967,756 B2
(45) Date of Patent: Apr. 23, 2024

(54) ANTENNA APPARATUS FOR VEHICLES, AND METHOD OF RECEIVING BROADCASTING BY USING THE ANTENNA APPARATUS

(71) Applicant: Samsung Electronics Co., Ltd., Gyeonggi-do (KR)

(72) Inventors: Yongsun Shin, Gyeonggi-do (KR); Jinu Kim, Gyeonggi-do (KR); Sangbong Sung, Gyeonggi-do (KR); Jeseung Oh, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/122,016

(22) Filed: Dec. 15, 2020

(65) Prior Publication Data

US 2021/0184341 A1 Jun. 17, 2021

(30) Foreign Application Priority Data

Dec. 17, 2019 (KR) ........................ 10-2019-0168657
Jan. 28, 2020 (KR) ........................ 10-2020-0010076

(51) Int. Cl.
*H01Q 1/32* (2006.01)
*H01Q 5/335* (2015.01)

(52) U.S. Cl.
CPC ......... *H01Q 1/3275* (2013.01); *H01Q 1/3283* (2013.01); *H01Q 1/3291* (2013.01); *H01Q 5/335* (2015.01)

(58) Field of Classification Search
CPC .. H01Q 1/3275; H01Q 1/3283; H01Q 1/3291; H01Q 5/335; H01Q 5/314;
(Continued)

(56) References Cited

U.S. PATENT DOCUMENTS 4,317,121 A 2/1982 Allen, Jr. et al.
6,087,990 A * 7/2000 Thill ...................... H01Q 21/28
343/700 MS
(Continued)

FOREIGN PATENT DOCUMENTS

CN 107834165 A 3/2018
DE 11 2017 001 763 T5 12/2018
(Continued)

OTHER PUBLICATIONS

Artner et al.; "Automotive Antenna Roof for Cooperative Connected Driving"; IEEE Access; vol. 7; Feb. 22, 2019; XP011711068.
(Continued)

*Primary Examiner* — Awat M Salih
(74) *Attorney, Agent, or Firm* — Cha & Reiter, LLC

(57) ABSTRACT

According to certain embodiments, a vehicle comprises a frame comprising at least one metal panel forming an exterior surface of the vehicle; an antenna disposed below the at least one metal panel in an interior of the vehicle; a printed circuit board (PCB) module electrically connected to the antenna; and at least one ground extender electrically connecting a ground of the PCB module to the metal panel, wherein the ground extender is configured to receive current from the PCB module, and provide the current from the PCB module to the metal panel.

18 Claims, 14 Drawing Sheets

(58) Field of Classification Search
CPC ............ H01Q 5/328; H01Q 1/38; H01Q 1/48; H01Q 1/243; H01Q 5/385; H01Q 9/30; H01Q 21/28; H01Q 1/44; H01Q 13/10; H01Q 1/24; H01Q 1/22; H01Q 9/42; H01Q 1/242; H01Q 1/273; H01Q 5/35; H01Q 5/378; H01Q 5/40; H01Q 7/00; H01Q 9/145; H01Q 1/32; H01Q 13/08; H01Q 1/2283; H01Q 1/2291; H01Q 1/3208; H01Q 1/36; H01Q 1/521; H01Q 13/16; H01Q 13/18; H01Q 21/08; H01Q 21/30; H01Q 5/307; H01Q 9/27; H01Q 9/28; H01Q 9/40; H01Q 1/10; H01Q 1/3216; H01Q 11/08; H01Q 3/02; H01Q 9/0485; H01Q 9/285; H01Q 1/50; H01Q 15/14; H01Q 19/10; H01Q 5/20
See application file for complete search history.

(56) References Cited

U.S. PATENT DOCUMENTS

| | | | | |
|---|---|---|---|---|
| 6,853,339 | B2 | 2/2005 | Sievenpiper et al. | |
| 8,537,060 | B2 | 9/2013 | Chung | |
| 8,810,471 | B2 | 8/2014 | Kang et al. | |
| 8,836,604 | B2 | 9/2014 | Yang et al. | |
| 11,233,318 | B2 | 1/2022 | Imamura et al. | |
| 2003/0174093 | A1* | 9/2003 | Huber | H01Q 1/526 343/702 |
| 2005/0057904 | A1 | 3/2005 | Nakabuchi | |
| 2016/0254590 | A1* | 9/2016 | Seo | H01Q 9/42 343/876 |
| 2019/0173179 | A1 | 6/2019 | Lee | |
| 2020/0194882 | A1* | 6/2020 | Kim | H01Q 1/3208 |
| 2020/0212548 | A1* | 7/2020 | Imamura | B60R 11/02 |
| 2020/0292654 | A1 | 9/2020 | Kumagai | |
| 2020/0389057 | A1* | 12/2020 | Hajimiri | G01S 7/415 |
| 2023/0141292 | A1* | 5/2023 | Han | H01Q 1/3208 342/372 |

FOREIGN PATENT DOCUMENTS

| | | | | |
|---|---|---|---|---|
| EP | 0 221 694 | A2 | 10/1986 | |
| EP | 0221694 | * | 10/1986 | |
| EP | 0221694 | A2 * | 10/1986 | H01Q 1/32 |
| EP | 0221694 | A2 | 10/1986 | |
| JP | 2003-017916 | A | 1/2003 | |
| JP | 4185453 | B2 | 11/2008 | |
| JP | 6479926 | B1 | 2/2019 | |
| JP | 2019-071548 | A | 5/2019 | |
| KR | 10-0974767 | B1 | 8/2010 | |
| KR | 10-1192298 | B1 | 10/2012 | |
| KR | 20-0470080 | | 11/2013 | |

OTHER PUBLICATIONS

International Search Report dated Mar. 22, 2021.
European Search Report dated May 18, 2021.
Indian Office Action dated Nov. 23, 2022.
Korean Office Action dated Feb. 28, 2024.

* cited by examiner

ANTENNA APPARATUS FOR VEHICLES, AND METHOD OF RECEIVING BROADCASTING BY USING THE ANTENNA APPARATUS

CROSS-REFERENCE TO RELATED APPLICATIONS

This application is based on and claims priority under 35 U.S.C. § 119 to Korean Patent Application No. 10-2019-0168657, filed on Dec. 17, 2019, and Patent Application No. 10-2020-0010076, filed on Jan. 28, 2020, in the Korean Intellectual Property Office, the disclosures of which are incorporated by reference herein in its entirety.

BACKGROUND

1. Field

The disclosure relates to antennas. More particularly, the disclosure relates to an antenna apparatus mounted on a vehicle to receive broadcasting, and a method of receiving broadcasting by using the antenna apparatus.

2. Description of the Related Art

With developments in communication technology, listening or watching broadcasted media such as radio broadcasting or television broadcasting in vehicles has become common. An antenna should be installed on a vehicle to receive broadcasting, and the installation location of the antenna directly affects performance of the antenna, stability of the vehicle, and the aesthetics of the vehicle. Currently, most antennas are installed within a shark fin module located on a glass or roof of vehicles.

When an antenna is installed on the glass of a vehicle, damage to the glass due to external impacts may bring damage to the antenna, and a long cable is needed to connect the antenna to a printed circuit board (PCB) module. When two or more antennas are installed on the glass to support diversity, an isolation issue between the antennas may occur.

Because shark fin modules are shaped to be exposed to the outside of antennas, there is a high risk of damage due to external impacts. Moreover, smaller shark fin modules require smaller-sized antennas. Smaller antennas are subject to, deterioration in radiation capability (or broadcasting reception capability). When several antennas are installed to receive various broadcasting signals, the number and/or size of shark fin modules are increased.

SUMMARY

According to certain embodiments, an antenna apparatus comprises: an antenna configured to be located below a metal panel of a vehicle; a printed circuit board (PCB) module electrically connected to the antenna; and at least one ground extender configured to electrically connect a ground of the PCB module to the metal panel, receive current from the PCB module, and provide the current from the PCB module to the metal panel.

According to certain embodiments, the antenna is configured to have a resonance frequency determined according to a location on a ground region of the PCB module where the at least one ground extender is arranged.

According to certain embodiments, the at least one ground extender comprises a plurality of ground extenders arranged at different locations within a ground region of the PCB module, and the PCB module comprises a control unit configured to receive a request to change a frequency to a target frequency from a broadcasting receiver, and to control a switch so that a current flows to a particular one of the plurality of ground extenders corresponding to the target frequency.

According to certain embodiments, the antenna apparatus further comprises a lifting module configured to receive a request to change a frequency to a target frequency from a broadcasting receiver and adjust a gap between the metal panel and the antenna according to the target frequency.

According to certain embodiments, the PCB module comprises: a variable impedance device located on a current path; and a control unit configured to receive a request to change a frequency to a target frequency from a broadcasting receiver and change a value of the variable impedance device according to the target frequency.

According to certain embodiments, the antenna is configured to be located between the metal panel and a dielectric panel.

According to certain embodiments, the metal panel comprises at least one of a hood panel, a trunk panel, a door panel, a fender panel, a bumper panel, a pillar panel, or a roof panel.

According to certain embodiments, a method of receiving broadcasting by using an antenna apparatus comprises: converting a broadcasting signal into a current by an antenna located below a metal panel of a vehicle; and amplifying the current and transmitting an amplified current to a broadcasting receiver by a printed circuit board (PCB) module, and providing a current flowing in a ground of the PCB module to the metal panel through at least one ground extender arranged on the ground of the PCB module.

According to certain embodiments, the at least one ground extender comprises a plurality of ground extenders arranged at different locations within a ground region of the PCB module, and wherein the method further comprises receiving, by the PCB module, a request to change a frequency from the broadcasting receiver to a target frequency and controlling a switch so that a current flows to a particular one of the at least one ground extender corresponding to the target frequency.

According to certain embodiments, the method further comprises receiving, by a lifting module, a request to change a frequency from the broadcasting receiver to a target frequency and adjusting a gap between the metal panel and the antenna according to the target frequency to which the frequency is changed.

According to certain embodiments, the method further comprises receiving, by the PCB module, a request to change a frequency from the broadcasting receiver to a target frequency, and changing a value of a variable impedance device located on a current path according to the target frequency to which the frequency is changed.

According to certain embodiments, a vehicle comprises a frame comprising at least one metal panel forming an exterior surface of the vehicle; an antenna disposed below the at least one metal panel in an interior of the vehicle; a printed circuit board (PCB) module electrically connected to the antenna; and at least one ground extender electrically connecting a ground of the PCB module to the metal panel, wherein the ground extender is configured to receive current from the PCB module, and provide the current from the PCB module to the metal panel.

According to certain embodiments, the antenna is configured to have a resonance frequency determined according to a location on a ground region of the PCB module where the at least one ground extender is arranged.

According to certain embodiments, the vehicle comprises a broadcasting receive configured to receive a signal from the PCB module, and wherein the at least one ground extender comprises a plurality of ground extenders arranged at different locations within a ground region of the PCB module, and wherein the PCB module comprises a control unit configured to receive a request to change a frequency from the broadcasting receiver to a target frequency, and to control a switch so that a current flows to a particular one of the plurality of ground extenders corresponding to the target frequency.

According to certain embodiments, the vehicle further comprises a broadcast receive configured to receive a signal from the PCB and a lifting module configured to receive a request to change a frequency from the broadcasting receiver to a target frequency and adjust a gap between the at least one metal panel and the antenna according to the target frequency to which the frequency is changed.

According to certain embodiments, the vehicle further comprises a broadcasting receiver configured to receive and output a signal from the PCB, and wherein the PCB module comprises: a variable impedance device located on a current path; and a control unit configured to receive a request to change a frequency from the broadcasting receiver to a target frequency and change a value of the variable impedance device according to the request to change the frequency.

According to certain embodiments, the vehicle further comprises a dielectric panel, wherein the antenna is disposed between the at least one metal panel and the dielectric panel.

According to certain embodiments, the at least one metal panel comprises at least one of a hood panel, a trunk panel, a door panel, a fender panel, a bumper panel, a pillar panel, or a roof panel.

BRIEF DESCRIPTION OF THE DRAWINGS

The above and other aspects, features, and advantages of certain embodiments of the disclosure will be more apparent from the following description taken in conjunction with the accompanying drawings, in which.

A brief description of each drawing is provided to better understand the drawings cited herein.

DETAILED DESCRIPTION

Figure 1:
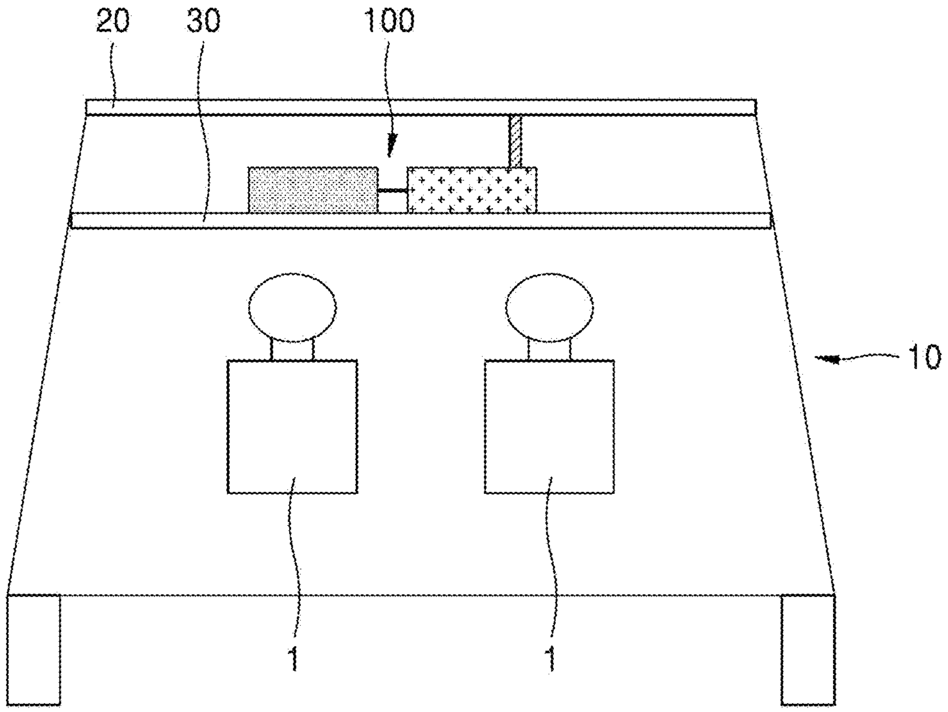
FIG. 1 is a schematic view of an antenna apparatus installed in a vehicle, according to an embodiment of the disclosure.

As the disclosure allows for various changes and numerous examples, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description of embodiments, certain detailed explanations of related art are omitted when it is deemed that they may unnecessarily obscure the essence of the disclosure. Also, numbers (for example, a first, a second, and the like) used in the description of embodiments are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Throughout the disclosure, the expression "at least one of a, b or c" indicates only a, only b, only c, both a and b, both a and c, both b and c, all of a, b, and c, or variations thereof.

Embodiments of the disclosure will now be sequentially described more fully with reference to the accompanying drawings.

Provided are an antenna apparatus for vehicles receives broadcast radio without exposure to the outside of vehicles, a vehicle include an antenna apparatus, and a method of receiving broadcasting by using an antenna apparatus.

Provided are an antenna apparatus for vehicles that has an improved radiation capability due to extension of the ground of a printed circuit board (PCB) module connected to an antenna, a vehicle including an antenna apparatus that has an improved radiation capability due to extension of the ground of a PCB, and a method of receiving broadcasting by using the antenna apparatus.

Provided are an antenna apparatus for vehicles that is able to receive broadcasting signals of various frequencies, a vehicle including an antenna apparatus that is able to receive broadcasting signals of various frequencies, and a method of receiving broadcasting by using the antenna apparatus.

Additional aspects will be set forth in part in the description which follows and, in part, will be apparent from the description, or may be learned by practice of the presented embodiments of the disclosure.

FIG. 1 is a schematic view of an antenna apparatus 100 installed in a vehicle 10, according to an embodiment of the disclosure.

The antenna apparatus 100 is installed below a metal panel 20 (such as a roof panel) forming an exterior surface of the vehicle 10. Accordingly, the antenna apparatus 100 is not exposed to the outside of the vehicle 10.

Referring to FIG. 1, the antenna apparatus 100 may be installed in a space between the metal panel 20 of the vehicle 10 and the dielectric panel 30 located below the metal panel 20. A space where passengers 1 are boarded is located below the dielectric panel 30.

Because the antenna apparatus 100 is located in a space below the metal panel 20 of the vehicle 10, the antenna apparatus 100 does not affect the aesthetics of the vehicle 10 and is not easily destroyed due to external impacts.

FIG. 1 illustrates that the antenna apparatus 100 is installed below a roof panel of the vehicle 10, and this illustration is merely an embodiment. The antenna apparatus 100 can be also installed under a hood panel, trunk panel, inside a door panel, fender panel, bumper panel, pillar panel as will now described with reference to FIG. 2.

Figure 2:
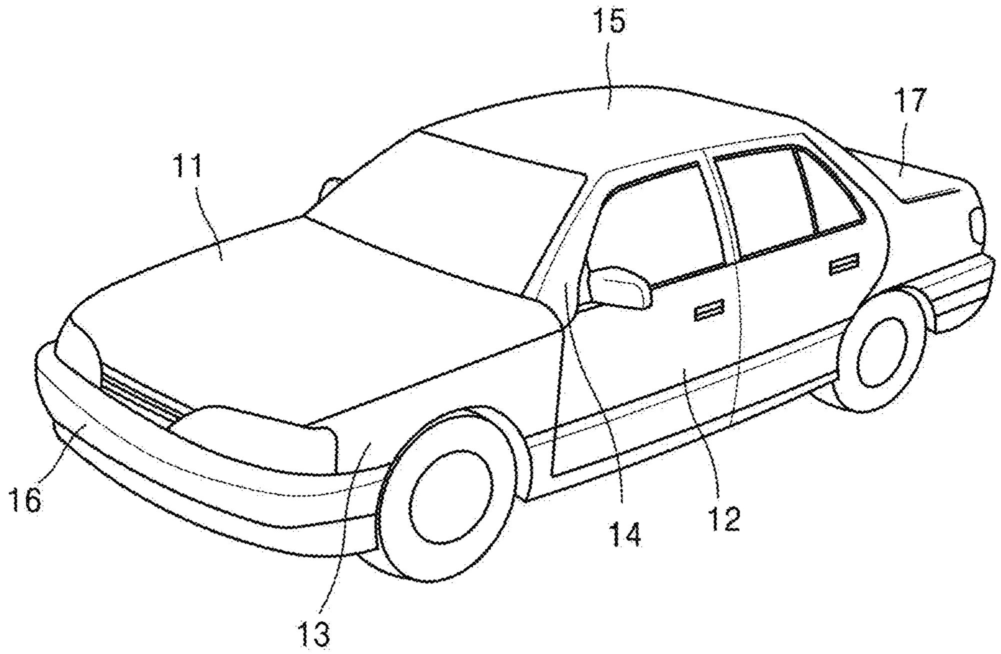
FIG. 2 is diagram of a vehicle comprising one or more metal panels where an antenna apparatus can be installed.

FIG. 2 is a diagram of a vehicle, with a frame with one or more metal panels where the antenna apparatus 100 can be installed.

Referring to FIG. 2, the antenna apparatus 100 may be installed under or in at least one of a hood panel 11, a door panel 12, a fender panel 13, a pillar panel 14, a roof panel 15, a bumper panel 16, or a truck panel 17 of the vehicle 10.

The door panel 12 may include not only a front door panel of the drivers side shown in FIG. 2, front passenger side, and both rear side passenger doors. In the case of a Van or a Sports Utility Vehicle (SUV) with a rear door, the antenna can be included in the rear door, as well. The fender panel 13 can include either the front or rear, on either the driver's side or passenger's side. The pillar panel 14 may include not only a front pillar panel on the driver's seat side shown in FIG. 2, but also a rear pillar panel on the driver's seat side, a front pillar panel on the passengers seat side, and a rear pillar panel on the passenger's seat side. The bumper panel 16 may include a front bumper panel shown in FIG. 2 as well as a rear bumper panel.

According to an embodiment, the antenna apparatus 100 may be installed according to panels that surround a front windshield, and/or panels that surround a rear windshield. According to an embodiment, when a sunroof is mounted in the vehicle 10, the antenna apparatus 100 may be installed along panels that surround the sunroof.

The locations of FIG. 2 where the antenna apparatus 100 is installable are examples, and the antenna apparatus 100 may be installed at a number of other points where spaces may be secured, between the metal panel 20 and the dielectric 30 of the vehicle 10.

Figure 3:
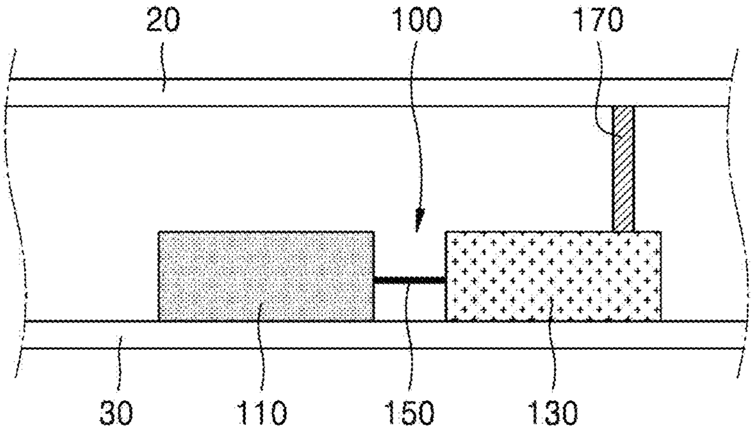
FIG. 3 is a schematic view of an antenna apparatus according to an embodiment of the disclosure.

FIG. 3 is a schematic view of the antenna apparatus 100 according to an embodiment of the disclosure.

Referring to FIG. 3, the antenna apparatus 100 may include an antenna 110, a printed circuit board (PCB) module 130, a feeding line 150, and at least one ground extender 170. The antenna 110 is configured to be located below a metal panel of a car, thereby avoiding exposure to the outside of the car and not affecting the aesthetic appearance of the car. The at least one ground extender 170 is configured to connect a ground of the PCB module to the metal panel, thereby improving the radiation capability of the antenna.

The antenna 110 receives a broadcasting signal that is broadcast from a radio broadcasting station. The radio broadcasting station transmits a content signal by modulating the content signal to a radio frequency signal, and amplifying the radio signal. The amplified radio signal propagates electromagnetic waves that are mixed with other electromagnetic waves that come from other sources, such as other radio stations, as well as natural sources. The antenna 110 may convert electromagnetic waves into a current. The antenna 110 may include a monopole antenna, a dipole antenna, a loop antenna, or a slot antenna.

The PCB module 130 is electrically connected to the antenna 110 through the feeding line 150, receives the current, filters the current to replicate radio signal from the radio station, amplifies and demodulates the replicated radio signal to replicate the content signal, and transmits the replicated content signal to a broadcasting receiver. The broadcasting receiver may include various apparatuses capable of outputting the replicated content signal, as visual data or audio data.

According to an embodiment, the PCB module 130 may include a tuner that matches an impedance of the broadcasting receiver with an impedance of the antenna 110.

The at least one ground extender 170 electrically connects a ground of the PCB module 130 to the metal panel 20 of the vehicle 10. In detail, the ground extender 170 extends from the PCB module 130 in a vertical direction, and has one end contacting a ground region within the PCB module 130 and the other end contacting the metal panel 20, so that a current flowing in the ground of the PCB module 130 may flow toward the metal panel 20. The at least one ground extender 170 may include a conductive material (for example, metal).

To improve a capability of receiving a broadcasting signal of a low frequency band, the ground of the PCB module 130 should have a large size equal to or greater than one wavelength (λ) of the radio frequency. The ground extender 170 plays a role of increasing the size of the ground of the PCB module 130.

The at least one ground extender 170 increases the size of the ground and enables not only the antenna 110 but also the vehicle 10 to operate as antennas, by electrically connecting the ground of the PCB module 130 to the metal panel 20.

The at least one ground extender 170 may be arranged at various locations within the ground region of the PCB module 130, and arrangeable locations of the at least one ground extender 170 will now be described with reference to FIG. 4.

Figure 4:
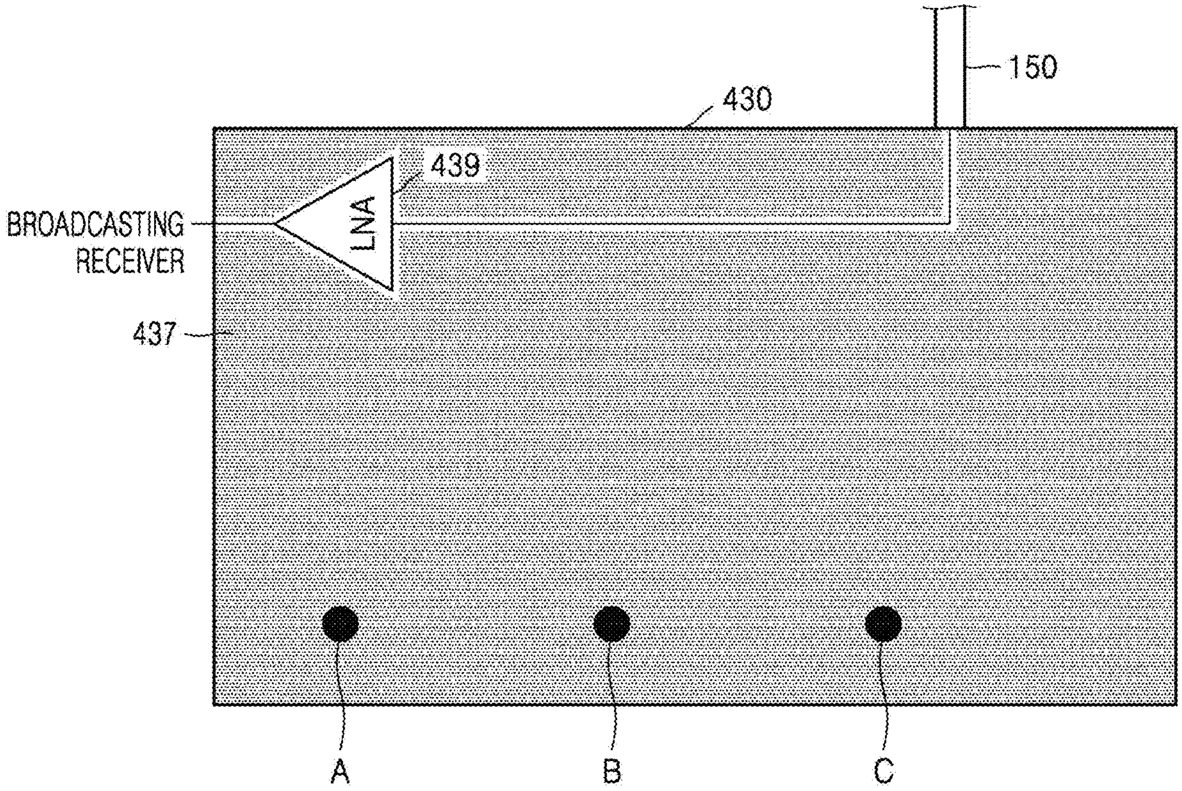
FIG. 4 illustrates a printed circuit board (PCB) module according to an embodiment of the disclosure.

FIG. 4 is a view of a PCB module 430 installable in the antenna apparatus 100, according to an embodiment of the disclosure.

FIG. 4 illustrates three locations A, B, and C where ones of the at least one ground extender 170 may be arranged within the PCB module 430.

There is a ground region 437 within the PCB module 430, and one of the at least one ground extender 170 may be arranged on the ground region 437 of the PCB module 430. For example, as shown in FIG. 4, the ground extender 170 may be arranged at location A, B, or C within the ground region 437.

Although FIG. 4 illustrates only three locations where the ones of the at least one ground extender 170 is installable, this is only by way of example, and the at least one ground extender 170 may be installed at a variety of other locations capable of transmitting a current flowing in the ground of the PCB module 430 to the metal panel 20.

The at least one ground extender 170 is connected to the metal panel 20, at a specific location within the ground region 437. According to what point of the ground region 437 the at least one ground extender 170 is installed at, a resonance frequency of the antenna apparatus 100 may be changed (see FIG. 7).

Accordingly, the at least one ground extender 170 is arranged at at least one location where the antenna apparatus 100 may resonate in a desired frequency band, from among the various locations of the ground region 437, and thus the antenna apparatus 100 may smoothly collect a broadcasting signal of the frequency band.

As shown in FIG. 4, a low noise amplifier 439 is connected to a current path connected to the feeding line 150, and a current amplified by the low noise amplifier 439 is transmitted to a broadcasting receiver.

Figure 5:
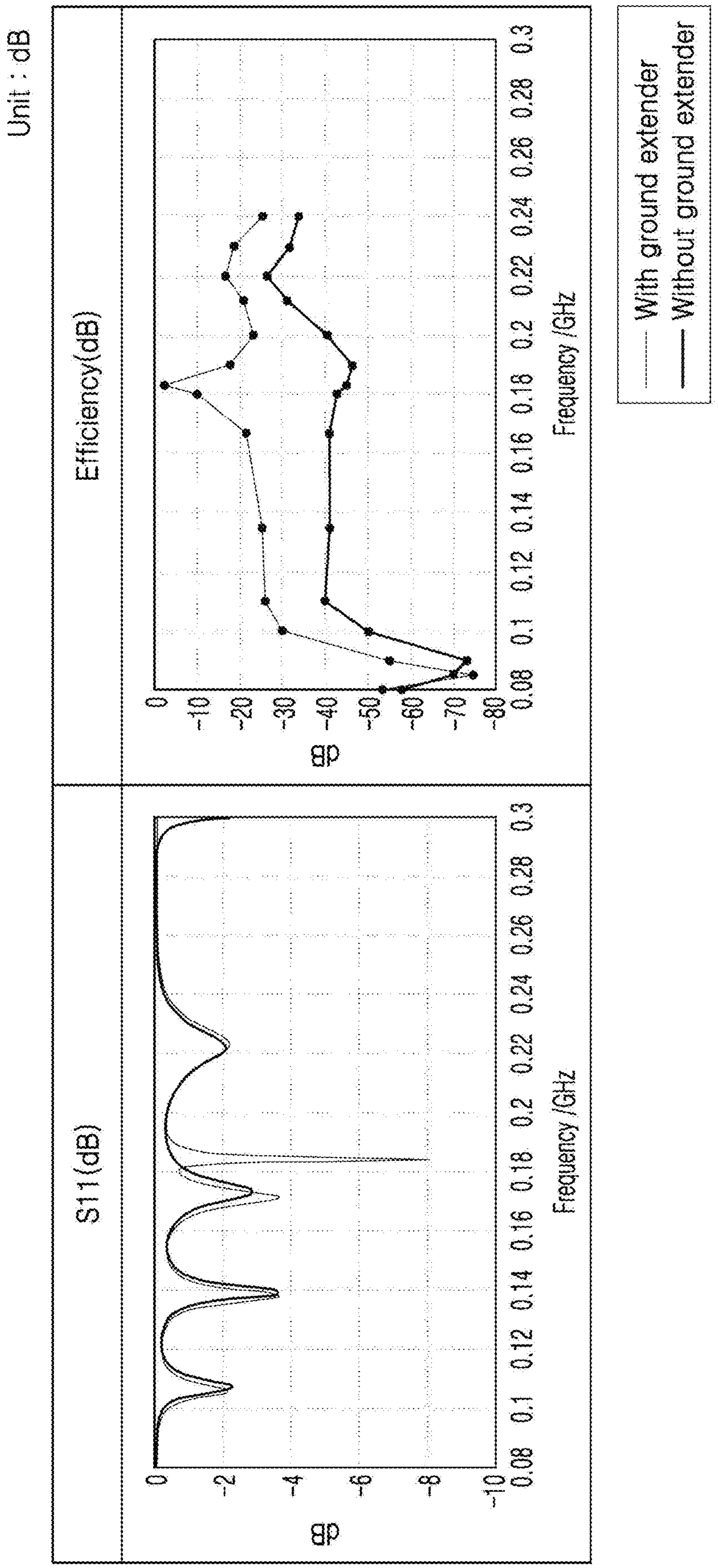
FIG. 5 is graphs comparing radiation characteristics according to presence or absence of a ground extender within an antenna apparatus.
Figure 6:
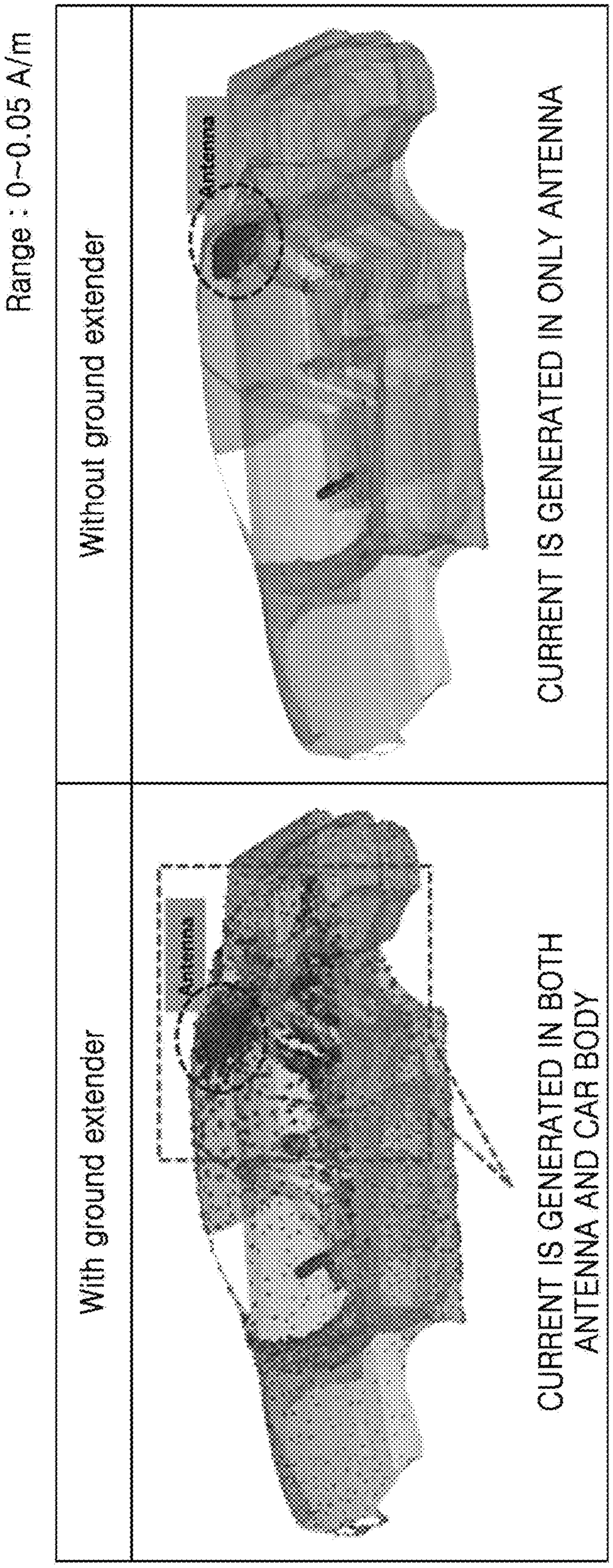
FIG. 6 is graphs comparing characteristics of a current flowing in a metal panel of a vehicle according to presence or absence of a ground extender within an antenna apparatus.

FIG. 5 is graphs comparing radiation characteristics according to presence or absence of the ground extender 170 within the antenna apparatus 100, and FIG. 6 is graphs comparing the characteristics of a current in the metal panel 20 of a vehicle according to presence or absence of the ground extender 170 within the antenna apparatus 100.

The left graph of FIG. 5 indicates a signal reflection coefficient of the antenna apparatus 100, and the right graph thereof indicates radiation efficiency of a signal.

As described above, the antenna apparatus 100 includes the ground extender 170 electrically connecting the ground of the PCB module 130 to the metal panel 20. As shown in the right graph of FIG. 5, when the ground extender 170 is applied, radiation efficiency in a frequency band for receiving broadcasting may be improved, compared when the ground extender 170 is not applied. This is because the ground region extends to the metal panel 20 through the ground extender 170.

As can be seen from the left graph of FIG. 5, resonance is the most smoothly achieved at about 0.18 GHz when the ground extender 170 is applied, whereas the antenna apparatus 100 does not resonate at the frequency, namely, about 0.18 GHz, when the ground extender 170 is not applied.

When the PCB module 130 is connected to the metal panel 20 by using the ground extender 170, as shown on the right side of FIG. 6, a current flows in the entire car body, and thus radiation efficiency of the antenna is improved. On the other hand, the antenna and the metal panel 20 are capacitively coupled to each other upon non-application of the ground extender 170, and thus a current is generated only in a portion of the car body around an antenna.

Figure 7:
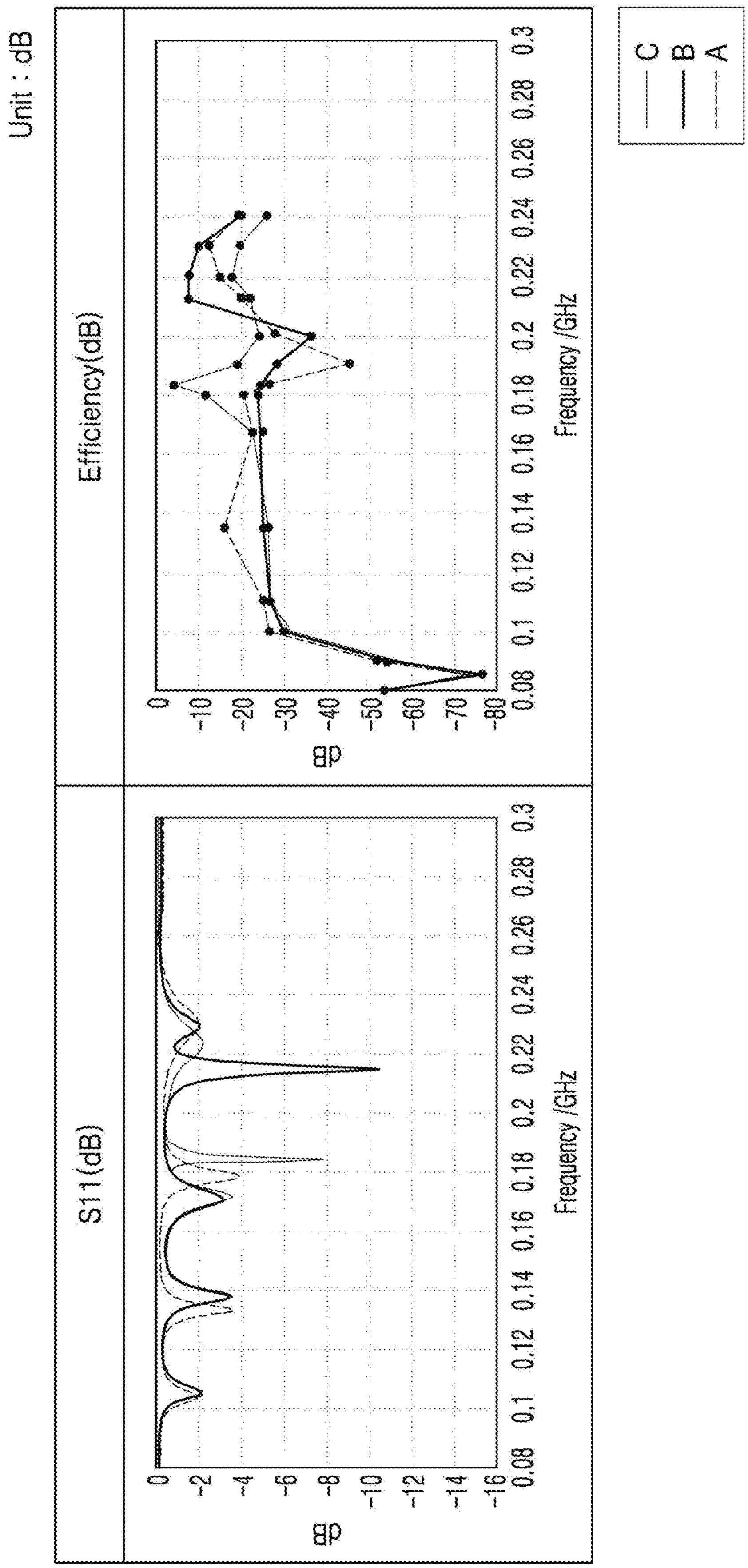
FIG. 7 is graphs comparing radiation characteristics according to arrangement locations of a ground extender within an antenna apparatus.

FIG. 7 are graphs comparing radiation characteristics according to connection locations of the at least one ground extender 170 within the antenna apparatus 100.

FIG. 7 illustrates radiation characteristics when the at least ground extender 170 is electrically connected to the metal panel 20 at different locations within the ground region of the PCB module 430. For example, plot A of FIG. 7 indicates radiation characteristics when the ground extender 170 is arranged at location A of FIG. 4, plot B thereof indicates radiation characteristics when the ground extender 170 is arranged at location B of FIG. 4, and plot C thereof indicates radiation characteristics when the ground extender 170 is arranged at location C of FIG. 4.

Referring to the left graph of FIG. 7, respective resonance frequencies when the at least one ground extender 170 is arranged at location A, at location B, and at location C are different from one another.

Referring to the right graph of FIG. 7, when the one of the at least one ground extender 170 is arranged at location A, radiation efficiency is optimal at about 0.23 GHz; when a second of the at least one ground extender 170 is arranged at location B, radiation efficiency is optimal at about 0.21 GHz; and when a third of the at least one ground extender 170 is arranged at location C, radiation efficiency is optimal at about 0.185 GHz.

In other words, the resonance frequency of the antenna apparatus 100 may be changed according to at what location on the ground region 437 of the PCB module 430 the at least one ground extender 170 is connected to the metal panel 20. Accordingly, by selecting an appropriate location from the ground region 437 within the PCB module 430 and making a current flow from the selected location to the metal panel 20 through the at least one ground extender 170, a broadcasting signal of a desired band could be collected.

Figure 8:
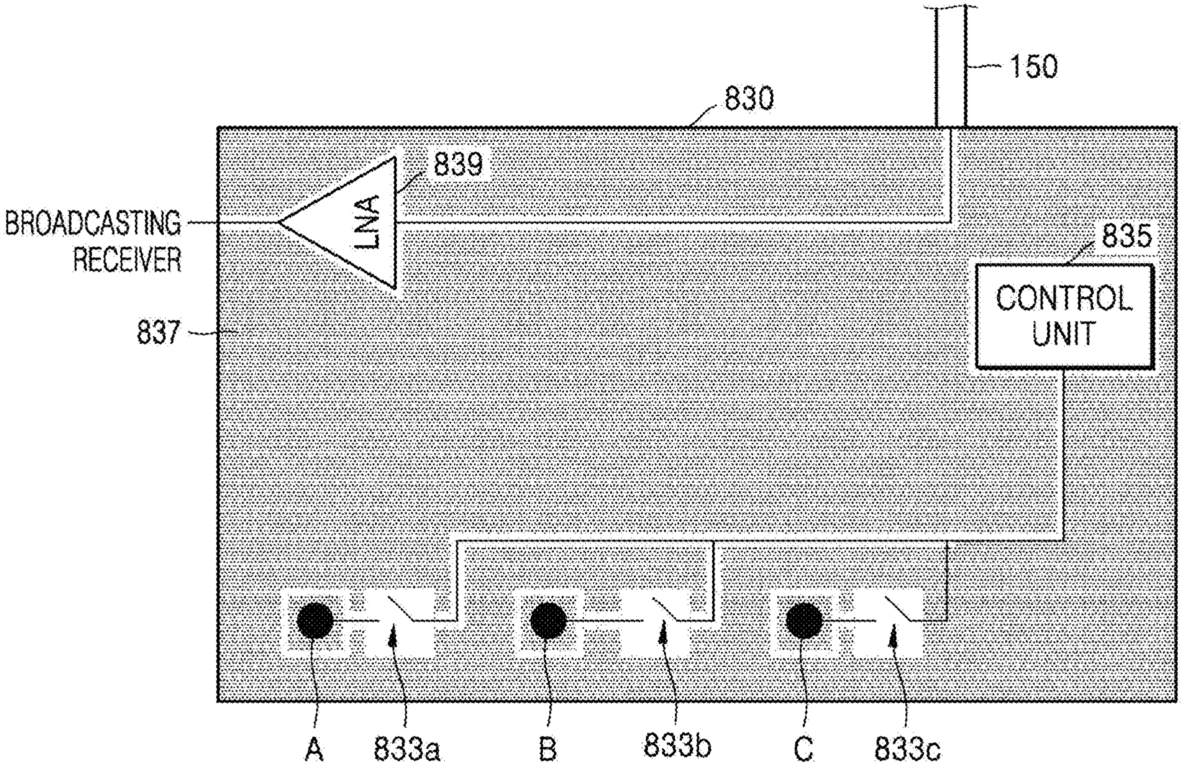
FIG. 8 illustrates a PCB module according to another embodiment of the disclosure.

FIG. 8 is a view of a PCB module 830 that may be included in the antenna apparatus 100, according to an embodiment of the disclosure. The PCB module 830 includes ground regions A, B, and C. Each of A, B, and C correspond to a particular frequency. That is, when a ground extender located at A, B, or C is connects the ground from the PCB to the metal panel, the corresponding frequency becomes the resonant frequency of the PCB.

Accordingly, one of the one or more ground extenders 170 and switch 833*a* is located at ground region A, a second of the one or more ground extenders 170 and switch 833*b* is located a ground region B, and a third of the one or more ground extenders 170 and switch 833*c* is located at ground region C. The control unit 835 can receive a request for a particular resonant frequency and, responsive thereto, selectively shorts one of the switches 833*a*, 833*b*, or 833*c*.

Referring to FIG. 8, the PCB module 830 may include a ground region 837, a control unit 835, a low noise amplifier 839, and one or more switches 833*a*, 833*b*, and 833*c*. The at least one ground extender 170 may be connected to the metal panel 20, at locations A, B, and C. In other words, one of the at least one ground extender 170 may be connected to the metal panel 20 at location A, a second of the at least one ground extender 170 may be connected to the metal panel 20 at location B, and a third of the at least one ground extender 170 may be connected to the metal panel 20 at location C. In other words, the at least ground extender 170 may be connected to the metal panel 20 at at least one location or at two or more locations at the same time.

Referring to FIG. 8, the ground of location A where the one of the at least one ground extender 170 may be arranged, the ground of location B where the second of the at least one ground extender 170 may be arranged, and the ground of location C where the third of the at least one ground extender 170 may be arranged are isolated from their neighboring ground regions. In other words, the ground of location A, the ground of location B, and the ground of location C may be isolated from their neighboring ground regions through a fill-cut. Accordingly, a current may be made flow to a desired ground from among the ground of location A, the ground of location B, and the ground of location C through ground switching using a variable diode, an FET device, a BJT device, etc.

FIG. 8 illustrates that ground extenders 170 are installed at three different locations within the PCB module 830 and the three switches 833*a*, 833*b*, and 833*c* are included in the PCB module 830 to achieve ground switching, but this illustration is merely an example. According to structures of a circuit of the PCB module 830, the number of ground extenders 170, the installation location of a ground extender 170, the number of switches, and the location of a switch may vary.

As described above, according to a location on the PCB module 830 where the ground extender 170 is connected to the metal panel 20, the resonance frequency of the antenna apparatus 100 may vary. According to the embodiment of FIG. 8, because the ground extenders 170 are connected to the metal panel 20 at a plurality of different locations, the PCB module 830 may adjust the resonance frequency of the antenna apparatus 100 through ground switching.

In other words, when receiving a request to change a frequency from a broadcasting receiver to a target frequency, the control unit 835 of the PCB module 830 may control the switches 833*a*, 833*b*, and 833*c* so that a current flows to only a ground extender 170 corresponding to the target frequency to which the frequency is changed from among the ground extenders 170 installed at different locations. A ground extender 170 arranged at a location where no currents flow does not affect the resonance frequency of the antenna apparatus 100.

A passenger may request a frequency change through a frequency control button or frequency control dial connected to the broadcasting receiver, and the broadcasting receiver may transmit a request for a change to the frequency requested by the passenger to the control unit 835 of the PCB module 830.

Describing ground switching in detail with reference to FIG. 8, the control unit 835 controls the a switch 833*a* and the b switch 833*b* to be turned off and the c switch 833*c* to be turned on, according to the request to change the frequency, so that a current may flow through location C, in detail, through the ground extender 170 installed at location C. The control unit 835 controls the a switch 833*a* and the c switch 833*c* to be turned off and the b switch 833*b* to be turned on, according to the request to change the frequency, so that a current may flow through location B, in detail, through the ground extender 170 installed at location B. The control unit 835 controls the b switch 833*b* and the c switch 833*c* to be turned off and the a switch 833*a* to be turned on, according to the request to change the frequency, so that a current may flow through location A, in detail, through the ground extender 170 installed at location A.

For example, it is assumed that a resonance frequency when a current flows to location B is greater than that when a current flows to location A, and a resonance frequency when a current flows to location C is greater than that when a current flows to location B. In this case, the control unit 835 may control the a switch 833*a* and the c switch 833*c* to be turned off and the b switch 833*b* to be turned on, so that a current flowing to location A flows to location B according to a frequency increasing request from the broadcasting receiver. Alternatively, the control unit 835 may control the a switch 833*a* and the b switch 833*b* to be turned off and the c switch 833*c* to be turned on, so that the current flowing to location B flows to location C according to a frequency increasing request from the broadcasting receiver.

According to the PCB module 830 of FIG. 8, the resonance frequency may be simply changed through ground switching using the switches 833*a*, 833*b*, and 833*c* each composed of a variable device according to the frequency increasing request from the broadcasting receiver.

In certain embodiments, the resonant frequency of the PCB can be set using a variable impedance device.

Figure 9:
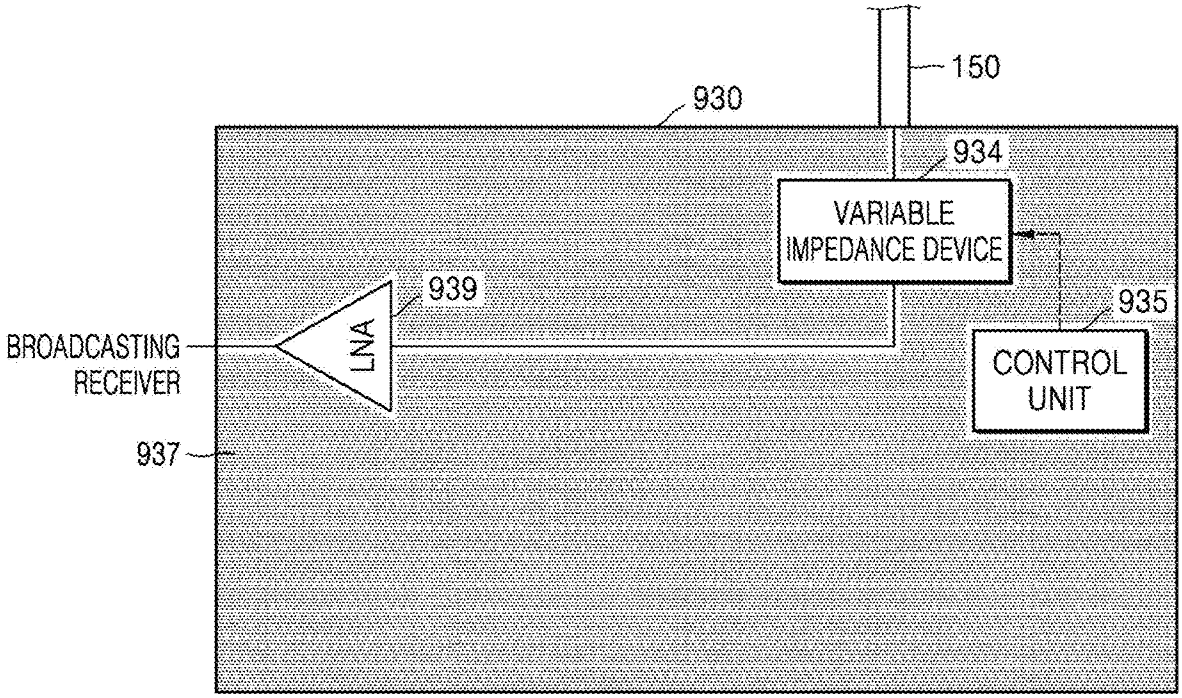
FIG. 9 illustrates a PCB module according to another embodiment of the disclosure.

FIG. 9 is a view of a PCB module 930 that may be included in the antenna apparatus 100, according to an embodiment of the disclosure.

Referring to FIG. 9, the PCB module 930 may include a variable impedance device 934, a control unit 935, and a low noise amplifier 939.

At least one ground extender 170 is arranged on the ground region 937, and is connected to the metal panel 20.

The control unit 935 may receive a request to change a frequency from a broadcasting receiver to a target frequency, and may change the value of the variable impedance device 934 according to a target frequency to which the frequency is changed. The variable impedance device 934 may include at least one of a variable capacitor or a variable inductor. Because the resonance frequency of the antenna apparatus 10 changes with a change in the value of the variable impedance device 934, the control unit 935 may receive a broadcasting signal of a desired frequency band by changing the value of the variable impedance device 934 according to the target frequency.

Figure 10:
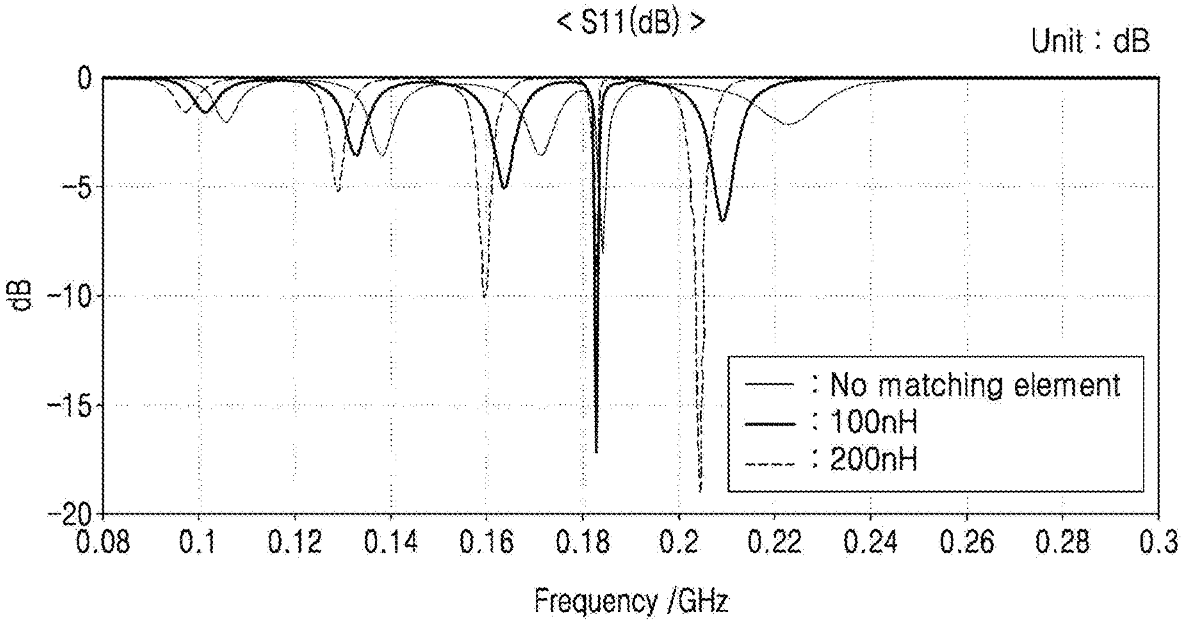
FIG. 10 is a graph showing radiation characteristics according to the value of a variable impedance device within a PCB module.

FIG. 10 is a graph showing radiation characteristics according to the value of the variable impedance device 934 within the antenna apparatus 100.

Referring to FIG. 10, respective resonance frequencies when there are no variable impedance devices 934, when the value of the variable impedance device 934 is 100 nH, and when the value of the variable impedance device 934 is 200 nH may be different from one another. In other words, a broadcasting signal of a band desired by a user could be collected, by adjusting the value of the variable impedance device 934 included in the PCB module 930.

In certain embodiments, the resonant frequency of the PCB can be set by adjusting the gap between the antenna 110 and the metal panel 20 using a lifting module 190.

Figure 11:
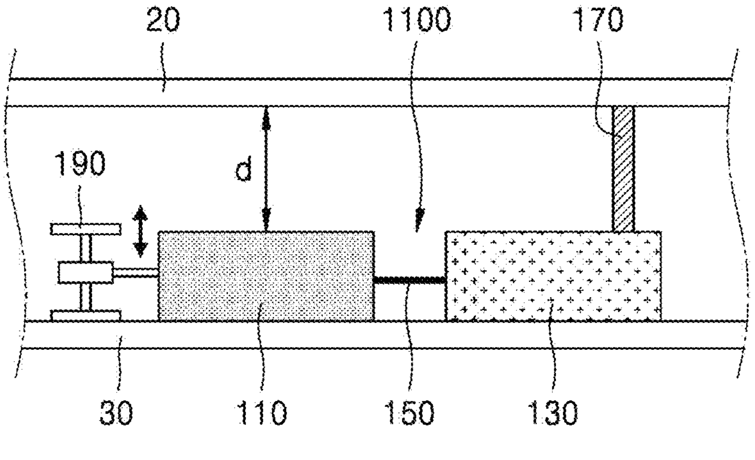
FIG. 11 is a schematic view of an antenna apparatus according to another embodiment of the disclosure.

FIG. 11 is a schematic view of an antenna apparatus 1100 according to another embodiment of the disclosure.

Referring to FIG. 11, the antenna apparatus 1100 may include the antenna 110, the feeding line 150, the PCB module 130, the ground extender 170, and a lifting module 190.

The antenna 110 collects a broadcasting signal that is broadcast from a broadcasting station. The antenna 110 may convert electromagnetic waves corresponding to the broadcasting signal into a current. The antenna 110 may include a monopole antenna, a dipole antenna, a loop antenna, or a slot antenna.

The PCB module 130 is electrically connected to the antenna 110 through the feeding line 150, receives the current, filters, demodulates, and amplifies the current, and transmits a signal to a broadcasting receiver. According to an embodiment of the disclosure, the PCB module 130 may include a tuner that matches an impedance of the broadcasting receiver with an impedance of the antenna 110. The ground extender 170 electrically connects a ground of the PCB module 130 to the metal panel 20 of a vehicle. In detail, one end of the ground extender 170 contacts the ground of the PCB module 130 and the other end thereof contacts the metal panel 20, and thus the ground of the PCB module 130 and the metal panel 20 may be electrically connected to each other. The ground extender 170 may include a conductive material (for example, metal).

The lifting module 190 adjust a gap d between the antenna 110 and the metal panel 20 by adjusting the height of the antenna 110. The lifting module 190 may adjust the height of the antenna 110 by performing the adjustment at the lateral surface of the antenna 110 as shown in FIG. 11, but this is merely an example. The lifting module 190 may adjust the height of the antenna 110 while supporting a lower surface of the antenna 110. In other words, the lifting module

190 may have one of various structures capable of adjusting the height of the antenna 110.

The antenna 110 and the metal panel 20 perform capacitive coupling, and, according to the capacitive coupling, a current generated in one of the antenna 110 and the metal panel 20 causes an induced current in the other. When the gap d between the antenna 110 and the metal panel 20 is changed, capacitance between the antenna 110 and the metal panel 20 is changed, and accordingly, the resonance frequency of the antenna apparatus 1100 may also be changed.

The lifting module 190 may receive a request to change a frequency from a broadcasting receiver, and may adjust the gap d between the antenna 110 and the metal panel 20 so that the antenna apparatus 1100 may resonate at a target frequency to which the frequency is changed. As will be described later with reference to 12, the resonance frequency increases with a decrease in the gap d between the antenna 110 and the metal panel 20, and thus the lifting module 190 may raise the antenna 110 according to a frequency increasing request from the broadcasting receiver, and conversely may lower the antenna 110 according to a frequency decreasing request from the broadcasting receiver.

Figure 12:
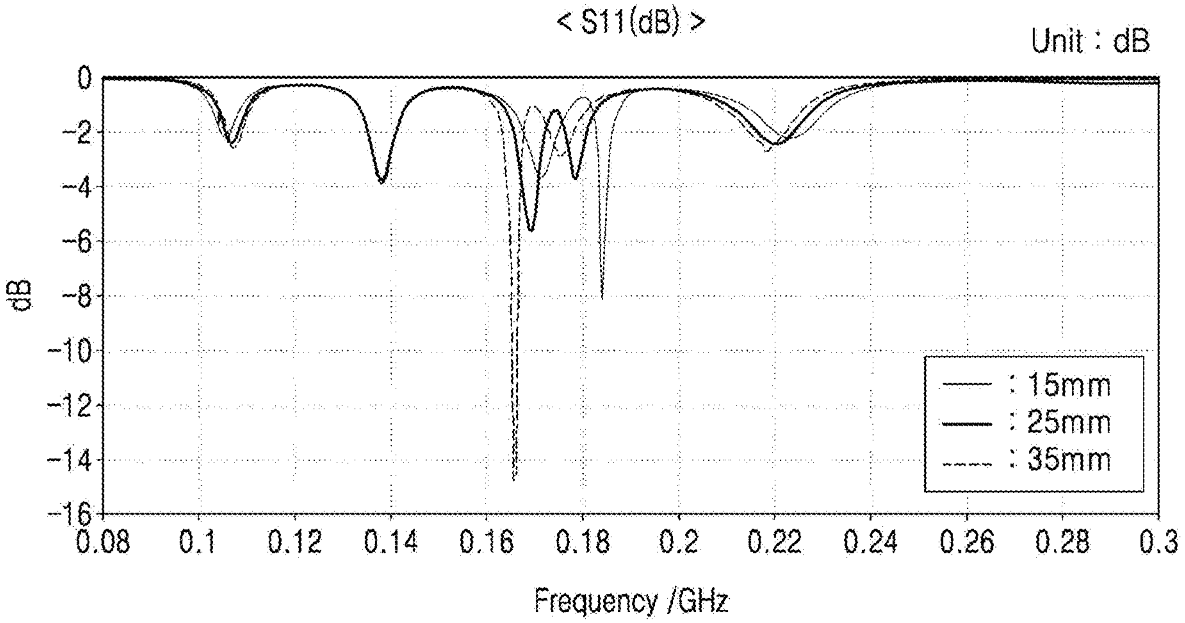
FIG. 12 is a graph showing radiation characteristics of an antenna apparatus according to a gap between an antenna and a metal panel.

FIG. 12 is a graph showing radiation characteristics of the antenna apparatus 1100 according to a gap between the antenna 110 and the metal panel 20.

Referring to FIG. 12, respective resonance frequencies when the gap between the antenna 110 and the metal panel 20 is 15 mm, when the gap therebetween is 25 mm, and when the gap therebetween is 35 mm may be different from one another. In other words, a broadcasting signal of a band desired by a user could be collected, by the lifting module 190 adjusting the height of the antenna 110.

Figure 13:
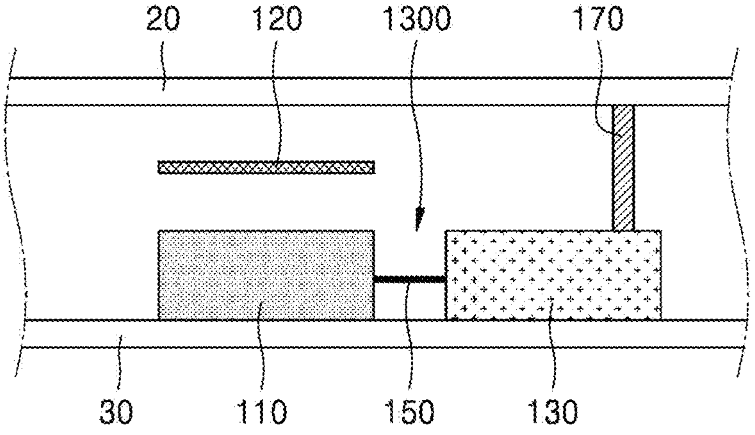
FIG. 13 is a schematic view of an antenna apparatus according to another embodiment of the disclosure.

FIG. 13 is a schematic view of an antenna apparatus 1300 according to another embodiment of the disclosure.

Referring to FIG. 13, the antenna apparatus 1300 may include the antenna 110, the feeding line 150, the PCB module 130, the ground extender 170, and a dielectric panel 120.

The antenna 110 collects a broadcasting signal that is broadcast to a broadcasting station. The antenna 110 may convert electromagnetic waves corresponding to the broadcasting signal into a current. The antenna 110 may include a monopole antenna, a dipole antenna, a loop antenna, or a slot antenna.

The PCB module 130 is electrically connected to the antenna 110 through the feeding line 150, receives the current corresponding to the broadcasting signal from the antenna 110, filters and amplifies the current, and transmits a result of the filtering and the amplification to a broadcasting receiver.

The ground extender 170 electrically connects a ground of the PCB module 130 to the metal panel 20 of a vehicle.

The dielectric panel 120 is located between the antenna 110 and the metal panel 20. The dielectric panel 120 is provided to adjust the capacitance of a space between the antenna 110 and the metal panel 20. As described above, because the antenna 110 and the metal panel 20 perform capacitive coupling, when the capacitance of the space between the antenna 110 and the metal panel 20 is changed, the resonance frequency of the antenna apparatus 1300 is also changed. In other words, the dielectric panel 120 may be located between the metal panel 20 and the antenna 110 such that the antenna apparatus 1300 may resonate at a frequency desired by a passenger.

Figure 14:
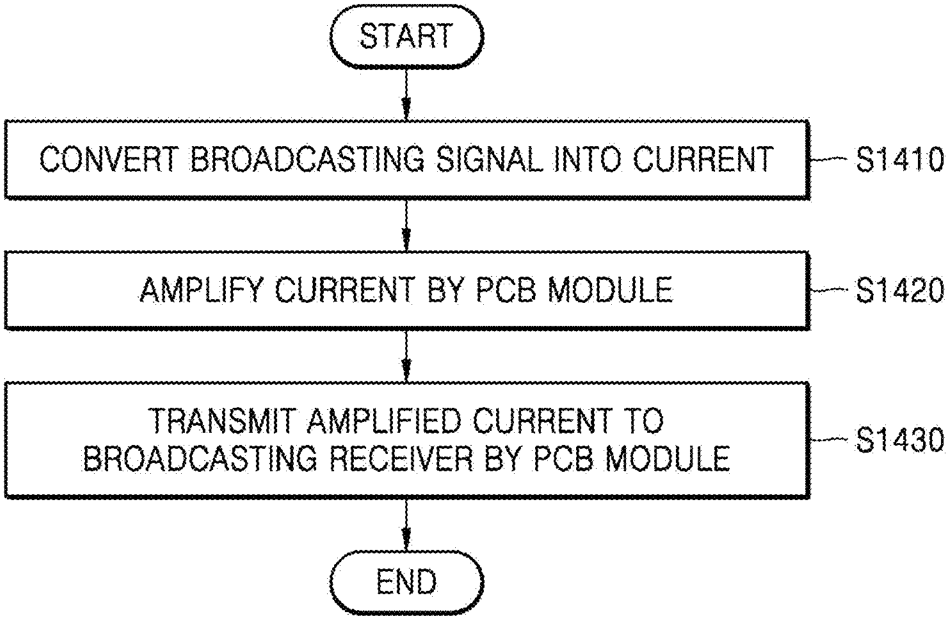
FIG. 14 is a flowchart of a method of receiving broadcasting by an antenna apparatus, according to an embodiment of the disclosure.

FIG. 14 is a flowchart of a method of receiving broadcasting by the antenna apparatus 100, according to an embodiment of the disclosure.

In operation S1410, the antenna apparatus 100 installed below the metal panel 20 of vehicle 10 collects a broadcasting signal radiated by a broadcasting station, and converts the broadcasting signal into a current. The broadcasting signal may be collected by the antenna 110 included in the antenna apparatus 100.

In operation S1420, the PCB module 130 transmits the current obtained by the antenna 110 and amplifies the current. In operation S1430, the PCB module 130 transmits an amplified current to a broadcasting receiver.

The broadcasting receiver outputs the amplified current as visual data or audio data through a monitor, a speaker, or the like.

As described above, the ground of the PCB module 130 is electrically connected to the metal panel 20 through the ground extender 170.

The PCB module 130 may receive a request to change a frequency from the broadcasting receiver, and may control a switch so that a current flows to a location corresponding to a target frequency to which the frequency is changed from among the different locations within the ground region where the ground extenders 170 are arranged, thereby collecting a broadcasting signal of a desired band.

The PCB module 130 may receive a request to change a frequency from the broadcasting receiver, and may change the value of a variable impedance device located on a current path according to the target frequency to which the frequency is changed, thereby changing the resonance frequency of the antenna apparatus 100.

According to an embodiment, the antenna apparatus 100 may further include the lifting module 190 to adjust the height of the antenna 110. In this case, a control unit (for example, a central processing unit) included in the lifting module 190 may receive a request to change a frequency from the broadcasting receiver, and may adjust a gap between the metal panel 20 and the antenna 110 according to the target frequency to which the frequency is changed, thereby changing the resonance frequency of the antenna apparatus 100.

The above-described embodiments may be stored as a program in a machine-readable storage medium. The machine-readable storage medium may be provided as a non-transitory storage medium. Here, the 'non-transitory storage medium' is a tangible device and means that the storage medium does not include a signal (for example, electromagnetic waves), but this term does not distinguish whether data is stored semi-permanently or temporarily in the storage medium. For example, the 'non-transitory storage medium' may include a buffer that temporarily stores data.

According to an embodiment, methods according to the various disclosed embodiments of the disclosure may be provided by being included in a computer program product. The computer program product may be traded as a commodity between a seller and a purchaser. The computer program product may be distributed in the form of a machine-readable storage medium (e.g., compact disc read only memory (CD-ROM)), or be distributed online (e.g., download or upload) via an application store (e.g., Play Store™) or directly between two user devices (e.g., smartphones). When distributed online, at least part of the computer program product (e.g., a downloadable app) may be temporarily generated or at least temporarily stored in a machine-readable storage medium, such as a memory of a manufacturer's server, a server of the application store, or a relay server.

In an antenna apparatus for vehicles and a method of receiving broadcasting by using the antenna apparatus, according to an embodiment of the disclosure, the antenna apparatus is not exposed to the outside of vehicles.

In the antenna apparatus for vehicles and the method of receiving broadcasting by using the antenna apparatus, according to an embodiment of the disclosure, the antenna apparatus may have an improved radiation capability due to extension of the ground of a PCB module connected to an antenna.

In the antenna apparatus for vehicles and the method of receiving broadcasting by using the antenna apparatus, the antenna apparatus is able to receive broadcasting signals of various frequencies.

However, effects attainable by the antenna apparatus for vehicles and the method of receiving broadcasting by using the antenna apparatus according to an embodiment of the disclosure are not limited to the aforementioned effects, and other effects not mentioned above will be clearly understood by one of ordinary skill in the art from the description below, While one or more embodiments of the disclosure have been described with reference to the figures, it will be understood by those of ordinary skill in the art that various changes in form and details may be made therein without departing from the spirit and scope as defined by the following claims.

What is claimed is:

1. An antenna apparatus comprising:

an antenna configured to be located directly below a metal panel forming an exterior surface of a vehicle, wherein the antenna is occluded by the metal panel;

a printed circuit board (PCB) module electrically connected to the antenna, wherein the PCB module comprises a ground region, a control unit, a first switch and a second switch; and a first ground extender arranged at a first ground location within the ground region to electrically connect a ground of the PCB module to a first location of the metal panel located directly above the first ground location; and a second ground extender arranged at a second ground location within the ground region to electrically connect the ground of the PCB module to a second location of the metal panel located directly above the second ground location, wherein the first ground location is isolated from other ground region by fill-cut, and the second ground location is isolated from the other ground region by the fill-cut, wherein the first ground extender is connected to the first switch, and the second ground extender is connected to the second switch, wherein the control unit configured to receive a request to change a frequency to a target frequency from a broadcasting receiver, and to control at least one of the first switch or the second switch so that a current flows to the first ground extender or the second ground extender corresponding to the target frequency, wherein the metal panel is continuous and forms a substantially common plane from directly above the antenna to the first location and the second location, and wherein the antenna and the metal panel are configured to perform capacitive coupling.

2. The antenna apparatus of claim 1, wherein the antenna is configured to have a resonance frequency determined according to the first ground location or the second ground location.

3. The antenna apparatus of claim 1, further comprising a lifting module configured to receive the request to change the frequency to the target frequency from the broadcasting receiver and adjust a gap between the metal panel and the antenna according to the target frequency.

4. The antenna apparatus of claim 1, wherein the PCB module further comprises a variable impedance device located on a current path, wherein the control unit configured to receive the request to change the frequency to the target frequency from the broadcasting receiver and change a value of the variable impedance device according to the target frequency.

5. The antenna apparatus of claim 1, further comprising a dielectric panel arranged between the metal panel and the antenna.

6. The antenna apparatus of claim 1, wherein the metal panel comprises at least one of a continuous metal hood panel, a continuous metal trunk panel, a continuous metal door panel, a continuous metal fender panel, or a continuous metal roof panel.

7. The vehicle of claim 1, wherein the substantially common plane is a horizontal plane, and the first location and the second location electrically connected to the first ground extender and the second ground extender are on the horizontal plane.

8. The vehicle of claim 1, wherein the metal panel comprises a metal roof panel and the first location and the second location electrically connected to the first ground extender are at least one point of the metal roof panel.

9. A method of receiving broadcasting by using an antenna apparatus, the method comprising:

receiving, by a printed circuit board (PCB) module, a request to change a frequency to a target frequency from a broadcasting receiver, wherein the PCB module comprises a ground region, a control unit, a first switch and a second switch;

converting a broadcasting signal into a current by an antenna located directly below a metal panel forming an exterior surface of a vehicle, wherein the antenna is occluded by the metal panel;

amplifying the current and transmitting an amplified current to the broadcasting receiver by the PCB module; and inducing current from one of the antenna and the metal panel to an other of the antenna and the metal panel, wherein the current from the one of the antenna and the metal panel generates an electromagnetic field, the electromagnetic field forming a current in the other of the antenna and the metal panel, wherein a first ground extender is arranged at a first ground location within the ground region to electrically connect a ground of the PCB module to a first location of the metal panel located directly above the first ground location, wherein a second ground extender is arranged at a second ground location within the ground region to electrically connect the ground of the PCB module to a second location of the metal panel located directly above the second ground location, wherein the first ground location is isolated from other ground region by fill-cut, and the second ground location is isolated from the other ground region by the fill-cut, wherein the first ground extender is connected to the first switch, and the second ground extender is connected to the second switch, wherein, in response to the request, the control unit configured to control at least one of the first switch or the second switch so that a current flows to the first ground extender or the second ground extender corresponding to the target frequency, wherein the metal panel is continuous and forms a substantially common plane from directly above the antenna to the first location and the second location.

10. The method of claim 9, further comprising receiving, by a lifting module, the request to change the frequency from the broadcasting receiver to the target frequency and adjusting a gap between the metal panel and the antenna according to the target frequency to which the frequency is changed.

11. The method of claim 9, further comprising receiving, by the PCB module, the request to change the frequency from the broadcasting receiver to the target frequency, and changing a value of a variable impedance device located on a current path according to the target frequency to which the frequency is changed.

12. A vehicle comprising:

a frame comprising a metal panel forming an exterior surface of the vehicle;

an antenna disposed directly below the metal panel in an interior of the vehicle, wherein the antenna is occluded by the metal panel;

a printed circuit board (PCB) module electrically connected to the antenna, wherein the PCB module comprises a ground region, a control unit, a first switch and a second switch;

a first ground extender arranged at a first ground location within the ground region to electrically connect a ground of the PCB module to a first location of the metal panel located directly above the first ground location; and a second ground extender arranged at a second ground location within the ground region to electrically connect the ground of the PCB module to a second location of the metal panel located directly above the second ground location, wherein the first ground location is isolated from an other ground region by fill-cut, and the second ground location is isolated from the other ground region by the fill-cut, wherein the first ground extender is connected to the first switch, and the second ground extender is connected to the second switch, wherein the control unit configured to receive a request to change a frequency to a target frequency from a broadcasting receiver, and to control at least one of the first switch or the second switch so that a current flows to the first ground extender or the second ground extender corresponding to the target frequency, wherein the metal panel is continuous and forms a substantially common plane from directly above the antenna to the first location and the second location, and wherein the antenna and the metal panel are configured to perform capacitive coupling.

13. The vehicle of claim 12, wherein the antenna is configured to have a resonance frequency determined according to the first ground location or the second ground location.

14. The vehicle of claim 12, further comprising a lifting module configured to receive the request to change the frequency from the broadcasting receiver to the target frequency and adjust a gap between the metal panel and the antenna according to the target frequency to which the frequency is changed.

15. The vehicle of claim 12, wherein the PCB module further comprises a variable impedance device located on a current path, wherein the control unit configured to receive the request to change the frequency from the broadcasting receiver to the target frequency and change a value of the variable impedance device according to the request to change the frequency.

16. The vehicle of claim 12, wherein the vehicle further comprises a dielectric panel, wherein the antenna is disposed between the metal panel and the dielectric panel.

17. The vehicle of claim 12, wherein the metal panel comprises at least one of a continuous metal hood panel, a continuous metal trunk panel, a continuous metal door panel, a continuous metal fender panel, or a continuous metal roof panel.

18. The vehicle of claim 12, wherein the metal panel is continuous about a top surface of the vehicle.

* * * * *